US010609464B2

United States Patent
Georgi et al.

(10) Patent No.: US 10,609,464 B2
(45) Date of Patent: *Mar. 31, 2020

(54) WIRELESS MICROPHONE AND/OR IN-EAR MONITORING SYSTEM AND METHOD FOR CONTROLLING A WIRELESS MICROPHONE AND/OR IN-EAR MONITORING SYSTEM

(71) Applicant: Sennheiser electronic GmbH & Co. KG, Wedemark (DE)

(72) Inventors: Sebastian Georgi, Langenhagen (DE); Jan Watermann, Hannover (DE)

(73) Assignee: Sennheiser electronic GmbH & Co. KG, Wedemark (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/435,639

(22) Filed: Jun. 10, 2019

(65) Prior Publication Data

US 2019/0335261 A1 Oct. 31, 2019

Related U.S. Application Data

(63) Continuation of application No. 15/736,869, filed as application No. PCT/EP2016/063640 on Jun. 14, 2016, now Pat. No. 10,362,379.

(30) Foreign Application Priority Data

Jun. 15, 2015 (DE) .......................... 10 2015 210 873

(51) Int. Cl.
*H04H 20/00* (2009.01)
*H04B 1/00* (2006.01)
(Continued)

(52) U.S. Cl.
CPC ........... *H04R 1/08* (2013.01); *H04L 27/2626* (2013.01); *H04R 3/00* (2013.01); *H04R 25/00* (2013.01); *H04R 2420/07* (2013.01)

(58) Field of Classification Search
CPC ........... H04R 2420/07; H04R 2499/11; H04W 72/0446
(Continued)

(56) References Cited

U.S. PATENT DOCUMENTS

2002/0159544 A1* 10/2002 Karaoguz ............. H04L 7/0062
375/329
2004/0053621 A1* 3/2004 Sugaya ............... H04W 72/082
455/450
(Continued)

FOREIGN PATENT DOCUMENTS

CN     204 316 653     5/2015
KR    1020120011794    2/2012
(Continued)

OTHER PUBLICATIONS

International Search Report for Application No. PCT/EP2016/063640 dated Sep. 14, 2016.
(Continued)

*Primary Examiner* — George C Monikang
(74) *Attorney, Agent, or Firm* — Haug Partners LLP

(57) ABSTRACT

A wireless microphone and/or in-ear monitoring system having at least one first mobile device for wirelessly transmitting first audio signals. The system also has at least one base station for wirelessly receiving the first audio signals transmitted by the mobile device. The wireless transmission is based on an orthogonal frequency-division multiplexing transmission (OFDM) during a time-division multiple access (TDMA) time slot. Each wireless microphone occupies at least one slot within 2 ms. Each of the TDMA frames
(Continued)

has a plurality of slots which respectively have precisely one OFDM symbol. Accordingly, precisely one OFDM symbol is transmitted in each TDMA slot. During a time slot made available in accordance with the TDMA, a transmission is effected on the basis of an OFDM method. The TDMA frame length is so short as a latency of <4 ms is required for professional audio transmission, for example in the case of wireless microphone systems.

26 Claims, 2 Drawing Sheets

(51) Int. Cl.
*H03D 7/00* (2006.01)
*H04B 1/38* (2015.01)
*H04R 3/00* (2006.01)
*H04R 1/08* (2006.01)
*H04L 27/26* (2006.01)
*H04R 25/00* (2006.01)

(58) Field of Classification Search
USPC .................. 381/122; 455/3.01, 91, 130, 73
See application file for complete search history.

(56) References Cited

U.S. PATENT DOCUMENTS

2009/0323600 A1* 12/2009 Chandra ............... H04W 28/18
370/329
2010/0098106 A1* 4/2010 Sung ................. H04W 72/1236
370/461
2010/0128806 A1* 5/2010 Francalanci ........... H04H 20/12
375/260
2013/0230186 A1* 9/2013 Li ............................ H04R 3/00
381/92
2015/0125013 A1 5/2015 Secall et al.

FOREIGN PATENT DOCUMENTS

KR 1020130138642 12/2013
KR 1020140138605 12/2014
WO WO 2012/108643 8/2012

OTHER PUBLICATIONS

Langton C, "Intuitive Guide to Principles of Communications. Orthogonal Frequency Division Multiplexing (OFDM)", Internet Citation, Jan. 1, 2004 (Jan. 1, 2004), p. 22pp, XP001539762.
Xudong Wang et al, "An OFDM-TDMA/SA MAC Protocol with QoS Constraints for Broadband Wireless LANs", Wireless Networks 12, 159-170, 2006 Springer Science and Business Media, Inc. Manufactured in The Netherlands. DOI: 10.1007/s11276-005-5263-1, Published online: Dec. 30, 2005.
Notice of Allowance issued for Korean Application No. 10-2018-7000284 dated Jan. 20, 2020.

* cited by examiner

WIRELESS MICROPHONE AND/OR IN-EAR MONITORING SYSTEM AND METHOD FOR CONTROLLING A WIRELESS MICROPHONE AND/OR IN-EAR MONITORING SYSTEM

The present application is a continuation of U.S. patent application Ser. No. 15/736,869 filed on Feb. 15, 2017, which claims priority from International Patent Application No. PCT/EP2016/063640 filed on Jun. 14, 2016, which claims priority from German Patent Application No. 10 2015 210 873.2 filed on Jun. 15, 2015, the disclosures of which are incorporated herein by reference in their entirety.

FIELD OF THE INVENTION

It is noted that citation or identification of any document in this application is not an admission that such document is available as prior art to the present invention.

The present invention concerns a wireless microphone and/or in-ear monitoring system and a method of controlling a wireless microphone and/or in-ear monitoring system.

Professional microphone and in-ear monitoring systems were hitherto unidirectional transmission links which continuously transmit and receive in a narrow channel. As a result the transmission direction was predetermined for each device and bidirectional exchange of items of control information was not possible. Microphone and in-ear links operated in parallel relationship were arranged in a frequency multiplex configuration.

On the German patent application from which priority is claimed the German Patent and Trade Mark Office searched the following documents: US 2015/0125013 A1 and WO 2012/108643 A2.

SUMMARY OF THE INVENTION

Therefore an object of the present invention is to provide an improved wireless microphone and/or in-ear monitoring system. In particular the invention seeks to provide a system which arranges microphone and in-ear links operated in parallel relationship in a time multiplex configuration and operates in a comparatively wide channel bandwidth. All devices used in the system are to be capable of transmitting and receiving data.

Thus there is provided a wireless microphone and/or in-ear monitoring system having at least one first mobile device, in particular a wireless microphone for wirelessly transmitting first audio signals. The system also has at least one base station for wirelessly receiving first audio signals transmitted by the at least one mobile device. The wireless transmission is based on an orthogonal frequency-division multiplexing transmission (OFDM) during a TDMA time slot. Each wireless microphone occupies at least one slot within 2 ms. Each of the TDMA frames has a plurality of slots which respectively have precisely one OFDM symbol. Accordingly precisely one OFDM symbol is transmitted in each TDMA slot. During a time slot made available in accordance with the TDMA a transmission is effected on the basis of an OFDM method. The TDMA frame length is so short as a latency of <4 ms is required for professional audio transmission, for example in the case of wireless microphone systems.

The wireless microphone and/or in-ear monitoring system according to the invention represents a so-called program making and special event system PMSE.

According to the invention the system deliberately uses an OFDM overhead (and thus additional resources) to achieve a system involving extremely low latency even in large halls.

According to a further aspect of the present invention the base station is adapted to wirelessly transmit second audio signals. The system further has a second mobile device, in particular a wireless in-ear monitor unit for wirelessly receiving second audio signals from the base station. Each wireless in-ear monitor unit receives at least one time slot within 2 ms.

According to a further aspect of the present invention the system has a third mobile device which can receive second audio signals and transmit first audio signals.

According to an aspect of the present invention each TDMA frame has a plurality of time slots or slots which respectively have precisely one OFDM symbol.

According to a further aspect of the present invention the OFDM symbol is prolonged with a cyclic prolongation (for example a cyclic prefix: CP) in order to counteract the detour transit times of the transmission channel. Those detour transit times occur due to multiple propagation, that is to say the radio waves pass from the transmitter to the receiver over different paths (and thus also involving different transit times).

According to a further aspect of the present invention each frame has at least two transmission direction switchover times (Turn around Time: TAT).

According to a further aspect of the present invention a frame has a plurality of slots for the first audio signal and a plurality of slots for the second audio signal (that is to say channel bundling). Channel bundling serves to enhance robustness and/or quality.

According to a further aspect of the present invention the transmission channel is of a width of between 5 MHz and 26 MHz.

According to a further aspect of the present invention a plurality of frames form a superframe. Within the superframe there is for example a beacon slot as a first slot, in the second frame there is a control slot as a first slot and in the third frame there is an answer slot as a first slot. The beacon slot, the control slot and the answer slot however can also be arranged differently.

According to a further aspect of the present invention the beacon slot has a beacon symbol whereby the mobile device measures the required reception gain (automatic gain control: AGC), the time frame synchronization and/or the carrier frequency offset (CFO). The control slot has items of control information for the mobile devices. The answer slot serves for acknowledgement of the exchange of control information in the control slot by the mobile devices.

According to a further aspect of the present invention the mobile device uses the measured carrier frequency offset (CFO) to correct the specific carrier frequency and thereby to synchronize with the carrier frequency of the base station.

Orthogonal frequency-division multiplexing (OFDM) is a modulation method which uses a plurality of orthogonal carriers for digital data transmission. An FFT operation can be used for efficient implementation. Time division multiple access TDMA (time multiplex method) provides a plurality of time portions or time slots, during which data of various transmitters can be transmitted on a channel. According to the invention an OFDM transmission occurs during such a time portion or time slot.

According to the invention, after a single OFDM symbol is received, the data in that symbol are decoded immediately.

In other words, contained in the OFDM symbol are all information for being able to decode the data in the symbol.

In the case of OFDM a large number of parallel narrow-band subcarriers is used to transmit information, instead of a single wide-band carrier. The respective carriers are modulated with a low data rate. By virtue of the fact that the signals are in orthogonal relationship with each other, no interference phenomena occur. The advantage of OFDM is that it represents robust transmission in regard to possible multi-path propagation.

The operation of wireless microphone and in-ear monitoring systems in large halls represents a typical use scenario. There, a large number of propagation paths between transmitting and receiving antennae occur by virtue of reflections at walls, ceilings and at the floor. It is possible to effectively and efficiently counteract the resulting distortions of the reception signal through the channel with the OFDM transmission technology. As a result operational reliability is greatly enhanced in comparison with usual single-carrier systems.

In an OFDM system transmission occurs in the form of OFDM symbols which contain a relatively large number of bits. If therefore digital audio detection is effected for example with a sampling rate of 48 kHz and a bit depth of 16 bits then firstly a larger number of such audio samples can be collected and then transmitted jointly in a time slot. The collection of audio samples before the transmission thereof gives rise however to a time displacement from the detection of an individual audio sample until its transmission.

The requirement for reliable wireless transmission of audio signals even in a large hall with the described reflection phenomena, which is resolved according to the invention by OFDM transmission, is therefore an aim in conflict with the requirement that is also involved for the shortest possible delay in transmission of the audio samples. There is therefore a wish for the OFDM transmission to be such that as little time as possible elapses from the transmission of data in a given time slot, until the same time slot is again next in turn. That gives rise to the endeavor to minimize the data block which is to be transmitted in a time slot. In an OFDM transmission however an ongoing comparison of the time basis and the frequency of a transmitting and a receiving subscriber is required. In known OFDM systems (for example WiFi IEEE 802.11) therefore each OFDM packet normally contains a training sequence which serves exclusively for that comparison and does not contain any useful information. In such systems therefore it is not possible to transmit an OFDM packet which contains exclusively an individual OFDM symbol as in fact the comparison information has to be transmitted at least beforehand.

According to the invention that conflict in aims is resolved by the described comparison information not being individually inserted in each time slot but transmitted jointly as part of a frame for all participating modules. By virtue of that measure it is now possible to provide only precisely one OFDM symbol in a time slot. That affords effective utilization of the time slots with at the same time minimization of the size of the data block which is transmitted in a time slot and thus minimization of the time elapsing from the detection of an audio sample to the transmission thereof.

BRIEF DESCRIPTION OF THE DRAWINGS

Advantages and embodiments by way of example of the invention are described more fully hereinafter with reference to the drawing.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

The wireless microphone and/or in-ear monitoring system according to the invention represents a so-called program making special event system PMSE.

Figure 1:
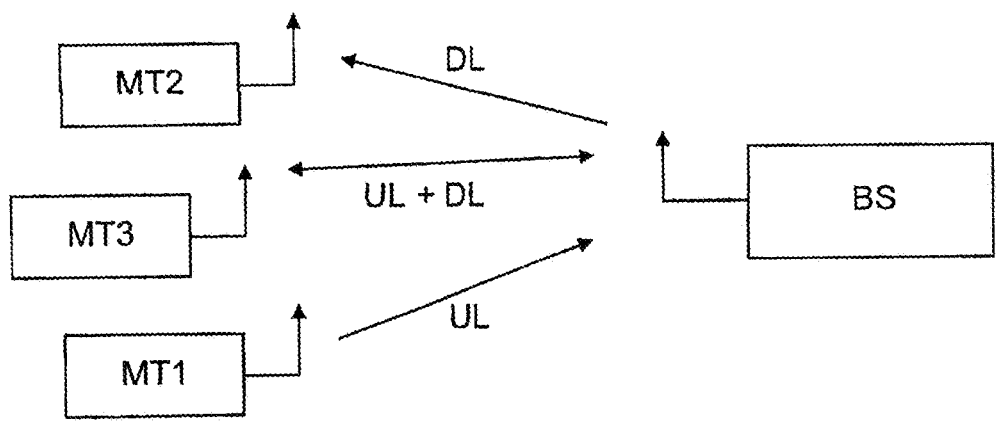
FIG. 1 shows a diagrammatic view of a wireless microphone and/or in-ear monitoring system according to a first embodiment.

FIG. 1 shows a diagrammatic view of wireless microphone and/or in-ear monitoring system according to a first embodiment. FIG. 1 shows a base station BS and three mobile devices (mobile terminals) MT1-MT3. The base station BS is typically a stationary apparatus and receives audio signals by way of a microphone channel from a first mobile device MT1 which can be in the form of a wireless microphone. The base station BS can send audio signals by way of an in-ear channel to a second mobile device MT2 which can be in the form of a wireless in-ear monitor unit. Transmission of the first audio signals from the microphone MT1 to the base station BS is identified as uplink UL and transmission of the second audio signal from the base station to the in-ear monitor unit MT2 is identified as downlink DL. Accordingly, in the wireless microphone and/or in-ear monitoring system, transmission of a first audio signal occurs in the uplink UL from the mobile device MT1 to the base station and/or a second audio transmission occurs in the downlink DL to the second mobile device MT2. A mobile device MT3 can participate both at the downlink DL and also at the uplink UL and therefore receives second audio signals and sends first audio signals.

Wireless transmission in the wireless microphone and/or in-ear monitoring system according to the invention is based on a wireless OFDM transmission in combination with a TDMA transmission. The TDMA does not involve a continuous transmission but only a transmission in time slots or slots. During each time slot a transmission occurs based on an OFDM symbol. Multiple access to the transmission channel can be guaranteed by the TDMA.

According to the invention, each OFDM symbol can be prolonged by a cyclic prolongation (for example cyclic prefix: CP). The length of the cyclic prolongation CP is determined by the maximum turn around time of the channel and the inaccuracy of time synchronization. An OFDM signal can have a high peak-to-average power ratio PAPR so that typically linear transmitter amplifiers have to be used. According to the invention a transmit power control (TPC) is used to reduce the transmission powers of the mobile devices, which also leads to a reduced power consumption.

That is advantageous as those devices are typically battery-powered. On the basis of the reception power of the downlink (DL) it is possible to infer the required transmission power for the uplink (UL).

According to the invention the transmission channel is of a width of between 5 MHz and 26 MHz. Preferably the channel width is 8 MHz. The carrier frequencies for the transmission can be selected from the frequency range between 470 MHz and 790 MHz and between 1.4 GHz and 1.8 GHz, but other frequency ranges are also possible if the frequency regulation authorities allow that.

Figure 2:
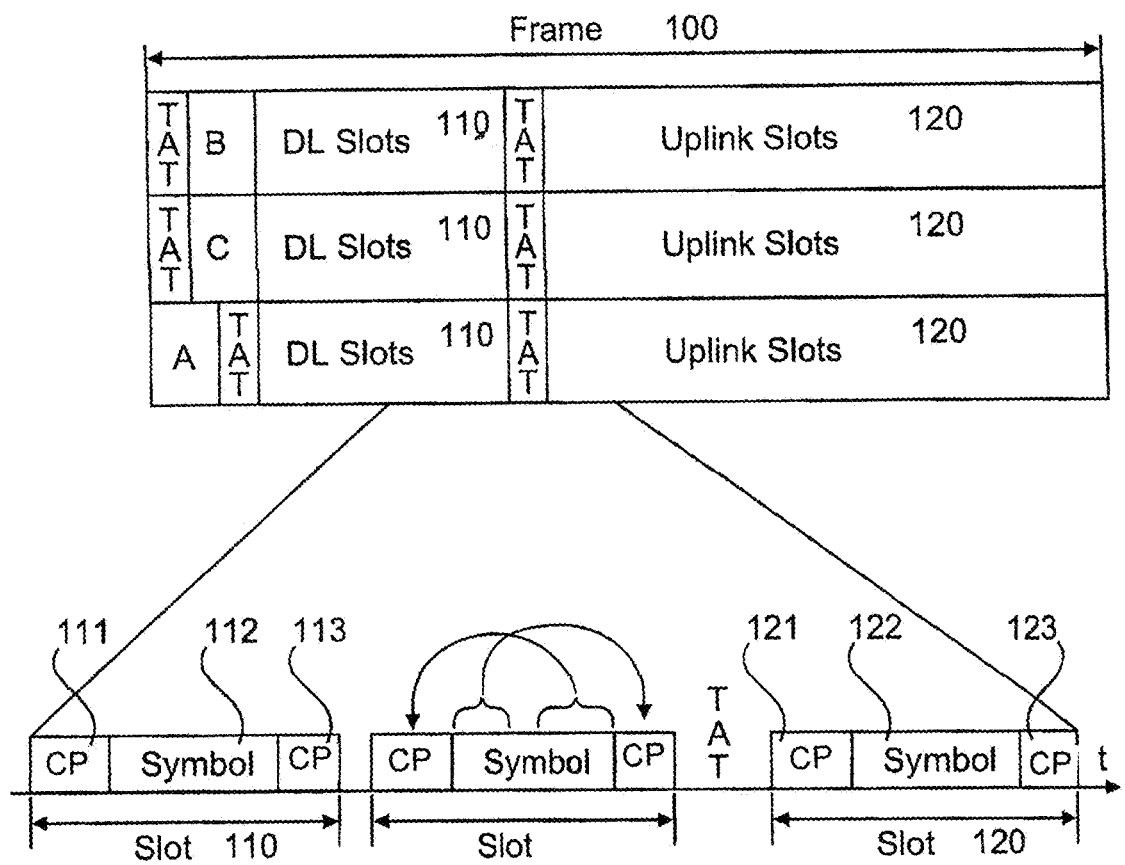
FIG. 2 shows a diagrammatic frame structure of a wireless transmission according to the first embodiment.

FIG. 2 shows a diagrammatic view of a frame structure of the wireless transmission according to the first embodiment. The wireless transmission to the base station and from the base station occurs based on the frame structure shown in FIG. 2. Each frame 100 has one or more downlink (DL) slots 110 and one or more uplink (UL) slots 120. In addition each frame 100 has at least two transmission direction turn around times (TAT) for altering the transmission direction. In addition thereto each frame can include further items of information. FIG. 2 shows three frames 100 which can be transmitted in time-successive relationship. The three frames 100 differ only in their first slot. Those differences are explained hereinafter. In addition FIG. 2 shows a portion of a frame around the second TAT comprising two DL slots 110 and one UL slot 120. Each slot is formed from precisely one OFDM symbol 112, 122 which is optionally cyclically prolonged forwardly and/or rearwardly.

For demodulation of an OFDM signal or symbol the reception power, the channel transmission function, the time position and the carrier frequency offset (CFO) have to be determined. Measurement of the reception power is required to match the gain of a reception unit to the dynamic range of the reception unit. That matching of the gain is effected by an automatic gain control (AGC). In order to segregate modulation symbols of each subcarrier in the OFDM transmission knowledge of the complex channel transmission factor of each subcarrier is necessary. Pilot-based channel estimation can be effected with interpolation for that purpose. Time synchronization has to be effected so that the Fast Fourier Transform FFT window can be suitably cut out.

Preferably a carrier frequency offset (CFO) is corrected before implementing the FFT in the time domain.

According to the invention each time slot has precisely one OFDM symbol optionally with a cyclic prolongation. That ensures that the latency of the system is low. Preferably the latency is equal to or less than 2 ms. According to the invention the same carrier frequency is used in the time duplex for transmission of the in-ear monitor channels and transmission of the microphone signals. Accordingly a TDMA frame 100 is subdivided into a downlink DL or downlink slots 110 (from the base station to the in-ear monitor unit) and an uplink UL or uplink slots 120 (from the wireless microphone to the base station BS), wherein the downlink DL and the uplink UL are respectively separated from each other by a transmission direction turn around time (TAT) for changing round the transmission direction.

According to the invention the first slot in a TDMA frame can optionally enjoy a special significance by serving for the exchange of items of control information. According to the invention three TDMA frames can be combined to form a superframe. In each of those three TDMA frames the first slot has a different function. The beacon slot B represents a downlink slot and does not contain information but a known symbol for automatic gain control, time synchronization and carrier frequency offset measurement CFO at the mobile device. According to the invention it is assumed that the values for automatic gain control, time synchronization and the carrier frequency offset measurement are constant within a TDMA superframe. The control slot C is also a downlink slot and is used for the transmission of items of control information to the already known mobile devices MT. The answer slot A is an uplink slot. By virtue of the answer slot A the mobile devices MT can acknowledge an exchange of control information from the preceding control slot C and/or send data. If the base station frees the answer slot A the mobile devices can independently send queries to the base station for example by way of the slotted Aloha method. In the situation where the answer slot A is defined as a rest period it can be used by all devices to look for interference sources in the frequency band used. The synchronized or slotted Aloha method is a multiple access method in which time slots are defined. Each station may transmit only at the beginning of a time slot. It is known from the literature.

Mobile devices MT1, MT3 in the form of wireless microphones receive the beacon slot B and the control slot C before they occupy an uplink slot or an answer slot A. Mobile devices which are in the form of in-ear monitor units do not occupy an uplink slot. They are nonetheless capable of transmitting in order to transmit control information in the answer slot A.

After a mobile device MT has received the beacon slot B it can determine the reception power of the downlink. In that case the beacon slot can have the same RMS power as any other slot. On the basis of the detected reception power of the downlink automatic gain control (AGC) can be performed. The beacon slot B can comprise repeating patterns. The phase rotation of two adjacent identical patterns within the beacon B indicates a carrier frequency offset (CFO). The time position of the beacon slot B in the frame is ascertained for time synchronization. According to the invention the mobile device MT can be synchronized to or with the beacon slot B by means of measurement of the carrier frequency offset (CFO) so that the mobile device MT is synchronized with the base station. In that way measurement of the carrier frequency offset (CFO) in the base station may be superfluous. The mobile device MT is so designed that no data are sent to the base station BS until time synchronization has occurred. Accordingly transmission of the uplink or all slots of the uplink UL is synchronous with the base station BS both in respect of time and also in regard to the carrier frequency. By means of a prolonged cyclic prolongation CP remaining inaccuracies in regard to time synchronization and the transit time differences can be compensated. Accordingly the base station does not have to perform time synchronization.

The mobile device MT can use the reception power of the beacon slot to determine the total channel damping. By means of the transmit power control (TPC) the transmission power can be so reduced that the power consumption of the MT is reduced and nonetheless sufficient reception power still occurs at the BS.

Figure 3:
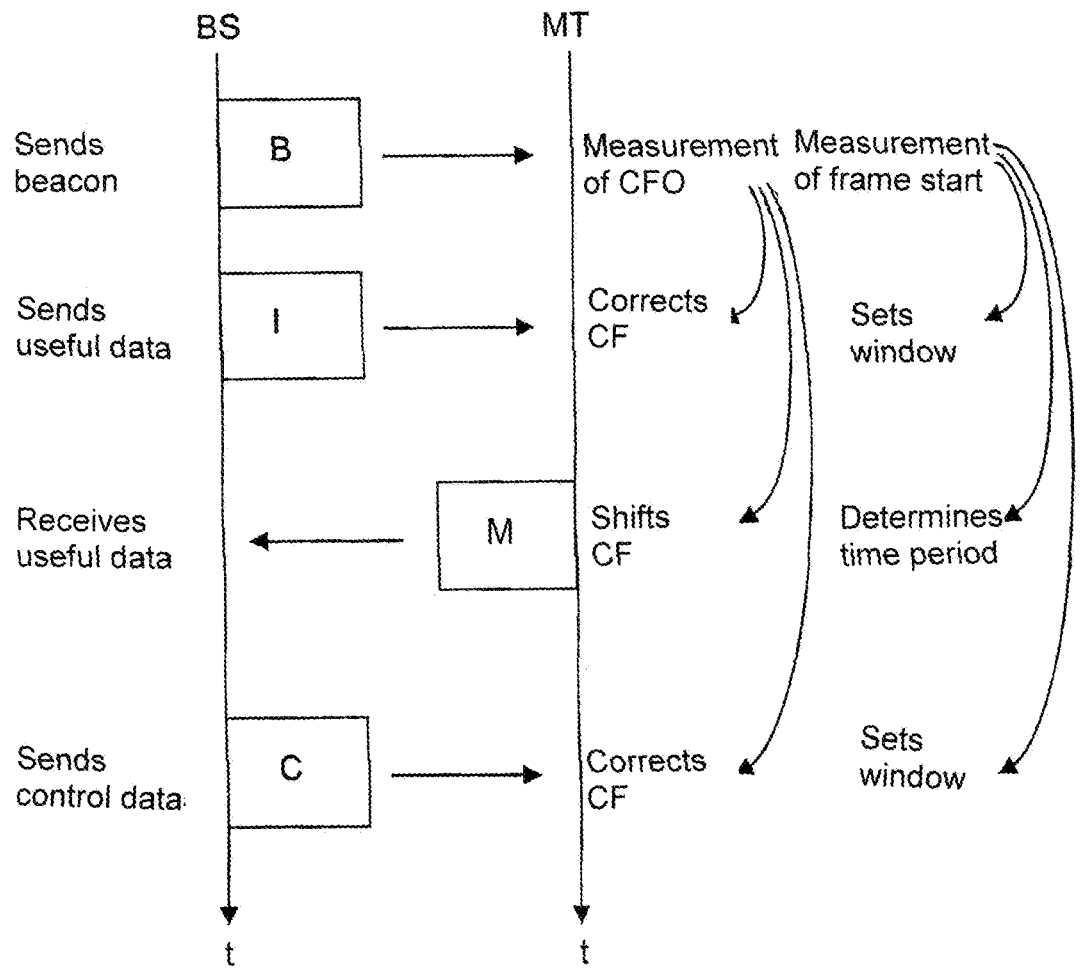
FIG. 3 shows a diagrammatic view of a synchronization process in the wireless transmission according to the first embodiment.

FIG. 3 shows a view of synchronization of the transmission according to the first embodiment. Firstly the base station BS sends the beacon slot B to the mobile device MT. Based on the information of the beacon slot BS measurement of the carrier frequency offset (CFO) and the start time of the superframe is effected. After the beacon slot BS has been sent the base station BS sends useful data which can represent in-ear monitor slots or control data C. The mobile device MT corrects the carrier frequency offset (CFO) and sets the reception FFT window. Before the mobile device MT sends the data in the microphone slots M a shift in the carrier frequency by the measured carrier frequency offset (CFO) is effected and a period of time for the transmission FFT window is determined. The base station BS receives the useful data in the microphone slots M without frequency or time synchronization having to be effected.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

The invention claimed is:

1. A wireless audio transmission system comprising:
   at least two mobile devices configured to:
      wirelessly transmit first audio signals;
      wirelessly receive second audio signals; or
      wirelessly transmit first audio signals and wirelessly receive second audio signals;
      wherein different mobile devices transmit different first audio signals and/or may receive different second audio signals; and
   at least one base station configured to:
      wirelessly receive the first audio signals transmitted by at least a first mobile device of the at least two mobile devices;
      wirelessly transmit the second audio signals to at least a second mobile device of the at least two mobile devices; or
      wirelessly receive the first audio signals transmitted by at least one of the at least two mobile devices and wirelessly transmit the second audio signals to the at least one of the at least two mobile devices;
   wherein the wireless transmission of the first audio signals, the second audio signals, or both is based on an orthogonal frequency-division multiplex ("OFDM") time-division multiple access ("TDMA") transmission, wherein TDMA frames are used, and each of the at least two mobile devices:
      transmits the first audio signals at least once per TDMA frame;
      receives the second audio signals at least once per TDMA frame; or
      transmits the first audio signals and receives the second audio signals at least once per TDMA frame;
   wherein each TDMA frame has a plurality of slots which respectively have one OFDM symbol;
   wherein at least one TDMA frame has a single beacon slot;
   wherein the at least one base station is configured to transmit a beacon symbol in the beacon slot to the at least two mobile devices;
   wherein each of the at least two mobile devices is configured to utilize the beacon symbol as comparison information for the OFDM based transmission; and
   wherein said OFDM based transmission of the first audio signals from the first mobile device and said OFDM based transmission of the second audio signals to the second mobile device is based on said beacon symbol.

2. The wireless audio transmission system as set forth in claim 1;
   wherein each OFDM symbol is prolonged by a cyclic prolongation.

3. The wireless audio transmission system as set forth in claim 1;
   wherein at least one TDMA frame has at least two transmission direction alteration times.

4. The wireless audio transmission system as set forth in claim 1;
   wherein the first audio signals, the second audio signals, or both are transmitted by a plurality of slots per TDMA frame.

5. The wireless audio transmission system as set forth in claim 1;
   wherein each TDMA frame has a length of 2 ms or less.

6. The wireless audio transmission system as set forth in claim 1;
   wherein a transmission channel of the wireless transmission has a width of between 5 MHz and 26 MHz.

7. The wireless audio transmission system as set forth in claim 1;
   wherein a plurality of frames form a superframe; and
   wherein at least a beacon slot, a control slot, and an answer slot are contained in different frames of said plurality of frames within the superframe.

8. The wireless audio transmission system as set forth in claim 7;
   wherein there is a transmission direction alteration between the control slot and the answer slot.

9. The wireless audio transmission system as set forth in claim 7;
   wherein the control slot has items of control information for the at least two mobile devices, and the answer slot is used for acknowledging an exchange of control information in the control slot.

10. The wireless audio transmission system as set forth in claim 1;
    wherein the beacon symbol is used by each of the at least two mobile devices to determine an automatic gain control, a time synchronization, a carrier frequency offset ("CFO"), or a combination thereof.

11. The wireless audio transmission system as set forth in claim 10;
    wherein the beacon symbol is used by at least one of the at least two mobile devices to determine at least the carrier frequency offset; and
    wherein the at least one mobile device is synchronized to a carrier frequency of the base station by means of the carrier frequency offset.

12. The wireless audio transmission system as set forth in claim 10;
    wherein the beacon symbol comprises repeating patterns; and
    wherein the carrier frequency offset is determined from a phase rotation between adjacent patterns within the beacon symbol.

13. The wireless audio transmission system as set forth in claim 1;
    wherein at least the second mobile device is configured to utilize the beacon symbol to determine a reception power of the OFDM transmission.

14. The wireless audio transmission system as set forth in claim 1;
    wherein each of the at least two mobile devices is configured to utilize the beacon symbol to perform a time synchronization of the TDMA frame.

15. The wireless audio transmission system as set forth in claim 1;
    wherein each OFDM symbol comprises all information that is required for decoding the OFDM symbol to obtain audio data of said first and/or second audio signals.

16. The wireless audio transmission system as set forth in claim 1;

wherein the at least two mobile devices comprise at least one wireless microphone and at least one wireless in-ear monitoring unit;
wherein the at least one wireless microphone wirelessly transmits said first audio signals; and
wherein the at least one in-ear monitoring unit wirelessly receives said second audio signals.

17. The wireless microphone and/or in-ear monitoring system as set forth in claim 16, further comprising:
at least one third mobile device that wirelessly transmits said first audio signals and wirelessly receives said second audio signals.

18. The wireless audio transmission system as set forth in claim 1;
wherein a plurality of TDMA frames form a superframe; and
wherein each of the TDMA frames of said plurality of TDMA frames within the superframe has at least two transmission direction alteration times.

19. The wireless audio transmission system as set forth in claim 1;
wherein each of the at least two mobile devices is configured to utilize the beacon symbol to synchronize their OFDM based transmission or reception of the audio signals; and
wherein the first mobile device is configured not to transmit data to the base station before being synchronized to the base station.

20. A method of controlling a wireless audio transmission system that has at least two mobile devices, and at least one base station, the method comprising:
performing at least one of:
wirelessly transmitting first audio signals from at least one mobile device of the at least two mobile devices to the at least one base station;
wirelessly transmitting second audio signals from the at least one base station to at least one mobile device of the at least two mobile devices; and
wirelessly transmitting first audio signals from at least one mobile device of the at least two mobile devices to the at least one base station, and wirelessly transmitting second audio signals from the at least one base station to the at least one mobile device;
wherein the wireless transmission of the first audio signals, the second audio signals, or both is based on an orthogonal frequency-division multiplex ("OFDM") time-division multiple access ("TDMA") transmission, wherein TDMA frames are used, and each of the at least two mobile devices:
transmits its respective first audio signals at least once per TDMA frame;
receives its respective second audio signals at least once per TDMA frame; or
transmits its respective first audio signals and receives its respective second audio signals at least once per TDMA frame;
wherein each TDMA frame has a plurality of slots which respectively have one OFDM symbol;
wherein at least one TDMA frame has a single beacon slot;
wherein the at least one base station is configured to transmit a beacon symbol in the beacon slot to the at least two mobile devices;
wherein each of the at least two mobile devices is configured to utilize the beacon symbol to synchronize their OFDM based transmission or reception of the audio signals;

wherein said wireless transmission of the first audio signals from the first mobile device and said OFDM based reception of the second audio signals in the second mobile device is synchronized based on said beacon symbol.

21. A wireless microphone system comprising:
at least two mobile microphone devices configured to wirelessly transmit audio signals via uplinks, wherein a first mobile microphone device of the at least two mobile microphone devices transmits first audio signals via a first uplink and a second mobile microphone device of the at least two mobile microphone devices transmits second audio signals via a second uplink; and
a base station configured to wirelessly receive the audio signals transmitted by the at least two mobile microphone devices;
wherein the wireless transmission of the first audio signals and the second audio signals is based on an orthogonal frequency-division multiplex ("OFDM") time-division multiple access ("TDMA") transmission, wherein TDMA frames are used, and each of the at least two mobile microphone devices transmits the respective audio signals at least once per TDMA frame;
wherein each TDMA frame has a plurality of slots which respectively have one OFDM symbol;
wherein at least one TDMA frame has a single beacon slot;
wherein the base station is configured to transmit a beacon symbol in the beacon slot to the at least two mobile microphone devices;
wherein each of the at least two mobile microphone devices is configured to utilize the beacon symbol as comparison information for the OFDM based transmission; and
wherein said OFDM based transmission of the first audio signals from the first mobile microphone device and said OFDM based transmission of the second audio signals from the second mobile microphone device is based on said beacon symbol.

22. The wireless microphone system as set forth in claim 21;
wherein each TDMA frame has a length of 2 ms or less; and
wherein each of the at least two mobile microphone devices transmits the respective audio signals at least once within 2 ms.

23. A method of controlling a wireless microphone system that has at least a first mobile device, a second mobile device, and a base station, wherein the first and second mobile devices are mobile microphone devices, the method comprising:
wirelessly transmitting first audio signals from the first mobile device via a first wireless uplink connection to the base station;
wirelessly transmitting second audio signals from the second mobile device via a second wireless uplink connection to the base station;
wherein the wireless transmission of the first audio signals and the second audio signals is based on an orthogonal frequency-division multiplex ("OFDM") time-division multiple access ("TDMA") transmission, wherein TDMA frames are used, and each of the first and second mobile devices transmits the respective audio signals at least once per TDMA frame;
wherein each TDMA frame has a plurality of slots which respectively have one OFDM symbol;

wherein at least one TDMA frame has a single beacon slot;

wherein the base station is configured to transmit a beacon symbol in the beacon slot to the mobile devices;

wherein each of the mobile devices is configured to utilize the beacon symbol for synchronizing their OFDM based transmission of the audio signals; and wherein said wireless transmission of the audio signals from the first mobile device and of the second audio signals from the second mobile device is synchronized based on said beacon symbol.

24. The method as set forth in claim 23;

wherein each TDMA frame has a length of 2 ms or less; and wherein each of the at least two mobile devices transmits the respective audio signals at least once within 2 ms.

25. A wireless audio transmission system comprising:

at least two mobile devices configured to:
  wirelessly transmit first audio signals;
  wirelessly receive second audio signals; or
  wirelessly transmit first audio signals and wirelessly receive second audio signals;
  wherein different mobile devices transmit different first audio signals and/or may receive different second audio signals; and at least one base station configured to:
  wirelessly receive the first audio signals transmitted by at least a first mobile device of the at least two mobile devices;
  wirelessly transmit the second audio signals to at least a second mobile device of the at least two mobile devices; or
  wirelessly receive the first audio signals transmitted by at least one of the at least two mobile devices and wirelessly transmit the second audio signals to the at least one of the at least two mobile devices;

wherein the wireless transmission of the first audio signals, the second audio signals, or both is based on an orthogonal frequency-division multiplex ("OFDM") time-division multiple access ("TDMA") transmission, wherein TDMA frames are used, and each of the at least two mobile devices:
  transmits the first audio signals at least once per TDMA frame;
  receives the second audio signals at least once per TDMA frame; or
  transmits the first audio signals and receives the second audio signals at least once per TDMA frame;

wherein each TDMA frame has a plurality of slots;

wherein at least one TDMA frame has a single beacon slot;

wherein the at least one base station is configured to transmit a beacon symbol in the beacon slot to the at least two mobile devices;

wherein each of the at least two mobile devices is configured to utilize the beacon symbol as comparison information for the OFDM based transmission; and wherein said OFDM based transmission of the first audio signals from the first mobile device and said OFDM based transmission of the second audio signals to the second mobile device is based on said beacon symbol.

26. The wireless audio transmission system as set forth in claim 25, wherein in at least one slot of the TDMA frame an OFDM symbol is transmitted.

* * * * *